(12) United States Patent
Miller et al.

(10) Patent No.: US 10,261,192 B2
(45) Date of Patent: Apr. 16, 2019

(54) RADIONAVIGATION FOR SWIMMERS

(71) Applicant: Apple Inc., Cupertino, CA (US)

(72) Inventors: Isaac Thomas Miller, El Granada, CA (US); Glenn Donald MacGougan, San Jose, CA (US); Xiao Xiao, Orinda, CA (US)

(73) Assignee: Apple Inc., Cupertino, CA (US)

(*) Notice: Subject to any disclaimer, the term of this patent is extended or adjusted under 35 U.S.C. 154(b) by 290 days.

(21) Appl. No.: 15/179,778

(22) Filed: Jun. 10, 2016

(65) Prior Publication Data

US 2017/0357007 A1  Dec. 14, 2017

(51) Int. Cl.
| | |
|---|---|
| *G01S 19/19* | (2010.01) |
| *G01S 19/40* | (2010.01) |
| *G01S 19/52* | (2010.01) |
| *G01S 5/02* | (2010.01) |
| *G01S 11/02* | (2010.01) |

(52) U.S. Cl.
CPC ............. *G01S 19/19* (2013.01); *G01S 19/40* (2013.01); *G01S 19/52* (2013.01); *G01S 5/02* (2013.01); *G01S 11/02* (2013.01)

(58) Field of Classification Search
CPC .......... G01S 19/19; G01S 19/26; G01S 19/40; G01S 19/42; G01S 19/52; G01S 19/09; G01S 19/05; G01S 19/48

USPC ..................................................... 342/357.23
See application file for complete search history.

(56) References Cited

U.S. PATENT DOCUMENTS

| | | | |
|---|---|---|---|
| 4,832,643 A * | 5/1989 | Schoofs | ................. A63B 31/04 441/56 |
| 9,253,751 B2 | 2/2016 | Shirai et al. | |
| 2008/0284650 A1 * | 11/2008 | MacIntosh | ......... A63B 24/0021 342/357.57 |
| 2011/0068973 A1 | 3/2011 | Humphreys et al. | |
| 2013/0311123 A1 | 11/2013 | Nieminen et al. | |
| 2016/0303443 A1 * | 10/2016 | Boggs | .................... A63B 53/10 |

FOREIGN PATENT DOCUMENTS

JP      2004-271219      9/2004

* cited by examiner

*Primary Examiner* — Harry K Liu
(74) *Attorney, Agent, or Firm* — Fish & Richardson P.C.

(57) ABSTRACT

Methods, systems and computer program products for radionavigation for swimmers are described. A mobile device configured to estimate a location using radio frequency signals can estimate a position of the swimmer when the mobile device is worn on a limb of the swimmer and periodically submerged. The mobile device can supply auxiliary information to a radionavigation subsystem to correct a navigation solution affected by limb motion of the swimmer and affected by the periodic submersion of the mobile device.

20 Claims, 7 Drawing Sheets

RADIONAVIGATION FOR SWIMMERS

TECHNICAL FIELD

This disclosure relates generally to device state determination using radio frequency (RF) signals.

BACKGROUND

A radionavigation receiver measures observables (e.g., pseudorange and Doppler shift) from RF signals which are used to compute an estimate of position, velocity and time (PVT). Because these observables are a function of antenna motion, if the radionavigation receiver embedded in a smartwatch or other wearable computer is worn on a wrist of a swimmer the PVT estimate can be inaccurate due to the inclusion of the velocity of the wrist in the PVT estimate. Additionally, because the radionavigation receiver can receive RF signals only when above water, the PVT estimate may be inaccurate due to the radionavigation receiver being periodically submerged under water.

SUMMARY

Radionavigation techniques for swimmers are disclosed in this specification. A mobile device with a radionavigation subsystem can estimate PVT for a swimmer when the mobile device is worn on a limb of the swimmer and periodically submerged under water. The mobile device can supply auxiliary information to the radionavigation subsystem to correct the PVT estimate affected by limb motion of the swimmer and by the periodic submersion under water. The auxiliary information can include a velocity of the limb relative to a torso of the swimmer. The radionavigation subsystem can then determine a PVT estimate using the velocity of the swimmer (e.g., velocity of the swimmer's torso) rather than the velocity of the swimmer's limb wearing the mobile device.

The features described in this specification can achieve one or more advantages. A mobile device implementing the disclosed implementations improves upon conventional radionavigation receivers by providing an accurate velocity of the swimmer even when the mobile device is worn on a moving limb and is periodically submerged under water. Accordingly, the mobile device implementing the disclosed implementations is suitable for radionavigation for swimmers, for example, in long-distance swimming across open waters, as well as for swimmers who want to measure velocity and distance traveled accurately for a fitness program.

The details of one or more implementations of the disclosed subject matter are set forth in the accompanying drawings and the description below. Other features, aspects and advantages of the disclosed subject matter will become apparent from the description, the drawings and the claims.

BRIEF DESCRIPTION OF THE DRAWINGS

Like reference symbols in the various drawings indicate like elements.

DETAILED DESCRIPTION

Example Positioning for a Swimmer

Figure 1:
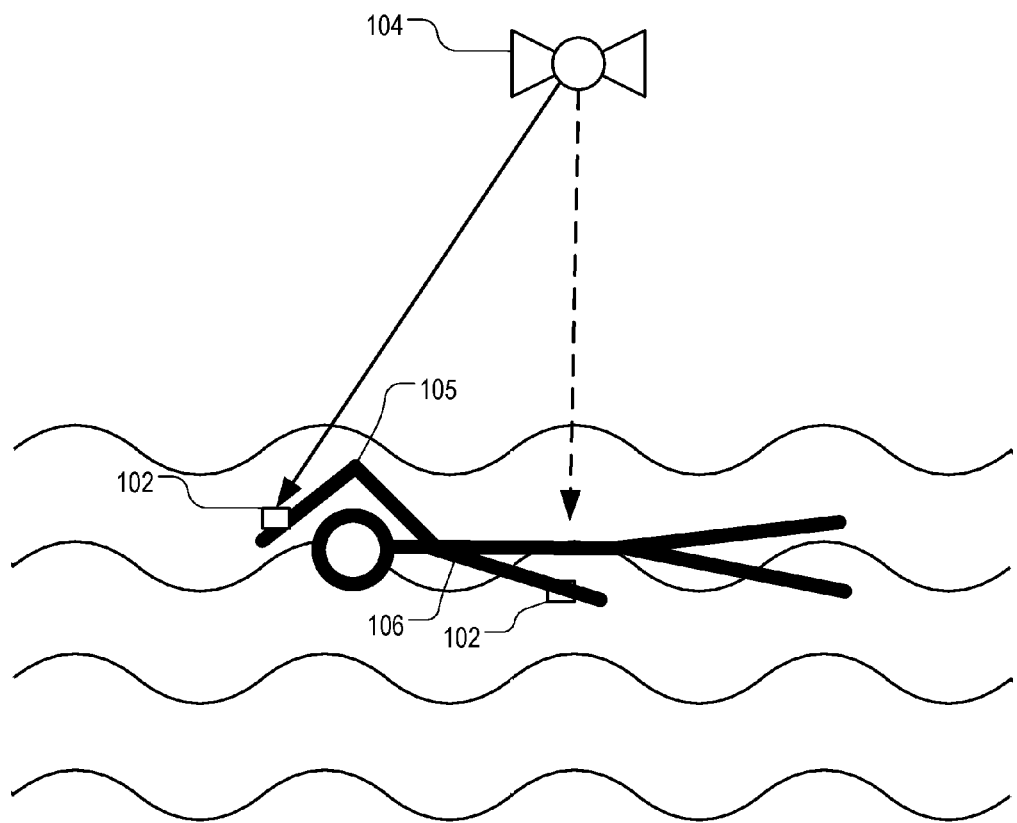
FIG. 1 is a diagram illustrating example techniques of radionavigation by a mobile device worn by a swimmer.

FIG. 1 is a diagram illustrating example techniques of radionavigation by a mobile device worn by a swimmer. Mobile device 102 can be a wearable device (e.g., a smart watch, a fitness meter, or a wrist radionavigation unit) configured to estimate PVT using radionavigation technologies. In particular, mobile device 102 can estimate PVT using RF signals from one or more signal sources 104. Signal sources 104 can be transmitters on satellites of a global navigation satellite system (GNSS). In various implementations, signal sources 104 can be wireless access points (APs) of one or more wireless local area networks (WLANs), cellular towers, or other beacons that emit RF signals. The latter can be used for indoor swimming where such APs may exist.

A swimmer can wear mobile device 102 on a limb while swimming. The swimmer can swim in various styles where the limb (and thus the mobile device) is above water periodically. For example, the swimmer can perform a crawl stroke, butterfly stroke, or backstroke, while wearing mobile device 102 on her wrist. At some portions of the stroke, e.g., at position 105, mobile device 102 is above water and can receive RF signals. At some other time in the stroke cycle, e.g., at position 106, mobile device 102 is submerged and cannot receive RF signals. Moreover, when mobile device 102 is above water, mobile device 102 tends to have higher linear velocity than the torso velocity of the swimmer, because a wrist tends to move from behind the torso to in front of the torso in the direction of travel. Accordingly, mobile device 102 may provide a PVT estimate that includes an incorrect velocity of the swimmer due to inclusion of the velocity of the wrist.

To correct the velocity component of the PVT estimate, mobile device 102 can perform the following vector computation:

$$V_{torso} = V_{device} - V_{rel}, \quad (1)$$

where $V_{torso}$ is a velocity of the torso of the swimmer, $V_{device}$ is the velocity component of the PVT estimate of mobile device 102 as initially determined by the radionavigation receiver of mobile device 102 using RF signals, and $V_{rel}$ is a relative velocity, which represents the velocity of mobile device 102 worn on a limb (e.g., wrist or arm) relative to the torso. Each of the velocities can be represented by a vector in a same reference coordinate frame. For example, mobile device 102 can represent the velocities in an Earth-Centered, Earth-Fixed (ECEF) reference coordinate frame, a geodetic reference coordinate frame, an East North Up (ENU) reference coordinate frame, or other three-dimensional reference coordinate frame.

Mobile device 102 can determine the relative velocity $V_{rel}$ using various techniques. Details and examples of determining the relative velocity $V_{rel}$ are described below in reference to FIG. 2. A radionavigation subsystem can derive the velocity of the torso $V_{torso}$ by performing the calculation of Equation (1). Mobile device 102 can then use the velocity of the torso $V_{torso}$ to represent the velocity of the swimmer. Mobile device 102 can provide the velocity of the torso as input to various applications or components. For example, in an application that estimates a distance traveled, the application can perform the computation of Equation (2) to determine a change in position:

$$\Delta P = V_{torso} \cdot \Delta t, \qquad (2)$$

where $\Delta P$ is a change in position, $\Delta t$ is time passed (e.g., from at a given second k to a second k+1).

Figure 2:
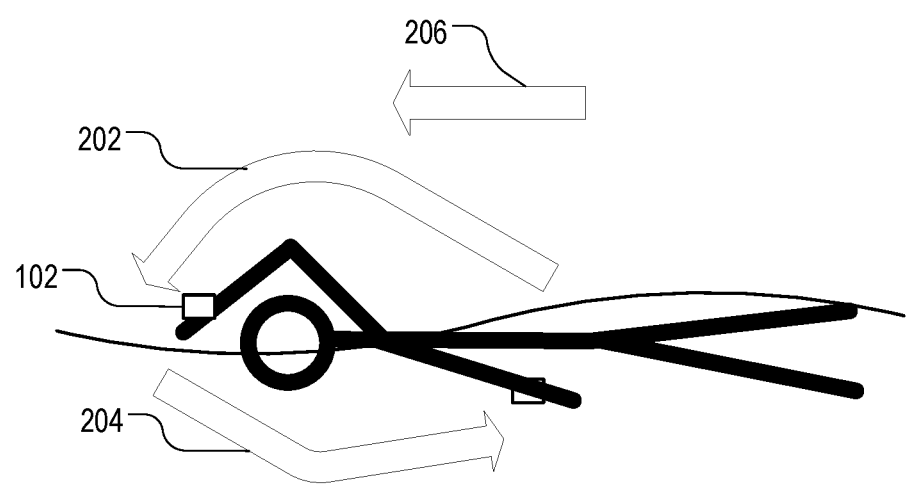
FIG. 2 is a diagram illustrating determining a relative velocity of a mobile device worn on a limb of a swimmer.

FIG. 2 is a diagram illustrating determining a relative velocity $V_{rel}$ of a mobile device 102 worn on a limb of a swimmer. In the example shown, a swimmer wears mobile device 102 on a limb (e.g., a wrist). Relative to the torso of the swimmer, mobile device 102 moves along motion paths 202 and 204. The swimmer moves along a direction of travel 206. Relative velocity $V_{rel}$ can be a compound of motion paths 202 and 204 and direction of travel 206. Mobile device 102 can estimate the relative velocity $V_{rel}$ using various techniques, including based on readings of sensors of mobile device 102, based on swimmer information, or both. Details and examples of the techniques are described below.

Mobile device 102 can determine relative velocity $V_{rel}$ using Equation (3):

$$V_{rel} = \text{speed} \cdot DoT, \qquad (3)$$

where speed is a scalar representing the speed of mobile device 102, and DoT is a unit vector representing the direction of travel of mobile device 102.

Mobile device 102 can determine the scalar speed using Equation (4).

$$\text{speed} = k \cdot L \cdot \omega_{limb}, \qquad (4)$$

where L is limb length, k is a scalar that adjusts the limb length based on the stroke type, and $\omega_{limb}$ is the angular speed of the rotating limb. In some implementations, mobile device 102 can determine the scalar k based on a location of mobile device on the limb, e.g., on the user's wrist or upper arm. Additional details and examples of determining the scalar k are described below in reference to FIGS. 3A-3C.

Mobile device 102 can determine the limb length L using various techniques. For example, mobile device 102 can determine the limb length L based on an average arm length of a human (e.g., about one meter). Mobile device 102 can determine limb length L based on a height of the swimmer, if that height is known. Mobile device 102 can derive the height based on various inputs, e.g., by user input or by comparing the height of the swimmer with an average height of humans for the gender of the swimmer. In some implementations, mobile device 102 can determine limb length L based on calibration from mobile device data.

Mobile device 102 can determine the angular speed $\omega_{limb}$ using various techniques. For example, mobile device 102 can determine angular speed $\omega_{limb}$ according to an average rotation frequency, e.g., 1 Hz, based on observation that an average swimmer can rotate arms at a frequency of between 0 Hz and 2 Hz. Mobile device 102 can determine angular speed $\omega_{limb}$ based on accelerometer data, where mobile device 102 can determine periodicity in acceleration data due to repetitive movements and derive the angular speed $\omega_{limb}$ based on the periodicity. For example, mobile device 102 can determine the angular speed $\omega_{limb}$ using Equation (5):

$$\omega_{limb} = 2\pi f, \qquad (5)$$

where f is the rotation frequency.

In some implementations, mobile device 102 can determine angular speed $\omega_{limb}$ based on barometer data, where mobile device 102 can determine the angular speed from a frequency that mobile device 102 enters water. For example, mobile device 102 can determine the frequency that mobile device 102 enters the water according to a change in measured atmosphere pressure as indicated by the barometer. Mobile device 102 can derive the angular speed $\omega_{limb}$ based on the frequency. The barometer can be a sensor built into mobile device 102.

In some implementations, mobile device 102 can determine angular speed $\omega_{limb}$ based on an attitude of mobile device 102. Mobile device 102 can determine the attitude using various sensors including, for example, a magnetometer, an accelerometer, a gyroscope, or a combination of the above. For example, mobile device 102 can determine angular speed from one or more gyro sensors of mobile device 102.

Mobile device 102 can determine the direction of travel DoT using various techniques. In some implementations, mobile device 102 can determine the direction of travel DoT by first determining a vector representing the direction of travel of mobile device 102 relative to the torso of the swimmer, and then combine the vector representing the relative direction of travel with a vector representing the direction of travel of mobile device 102 as determined in an initial PVT estimate. In some implementations, mobile device 102 can determine the direction of travel DoT directly, using readings from various sensors.

Mobile device 102 can use a reading from a magnetometer of mobile device 102 to determine East and North components of the direction of travel in an ENU coordinate frame. In addition, mobile device 102 can use readings from an accelerometer to determine an Up component of the direction of travel (e.g., based on gravity g). Mobile device 102 can then determine the direction of travel DoT in the ENU reference frame. Mobile device 102 can convert the direction of travel DoT into a reference coordinate frame of $V_{device}$ (e.g., ECEF) using a rotation matrix, such that the relative velocity $V_{rel}$ of Equation (3) is in the same reference coordinate frame of $V_{device}$.

Figure 3A:
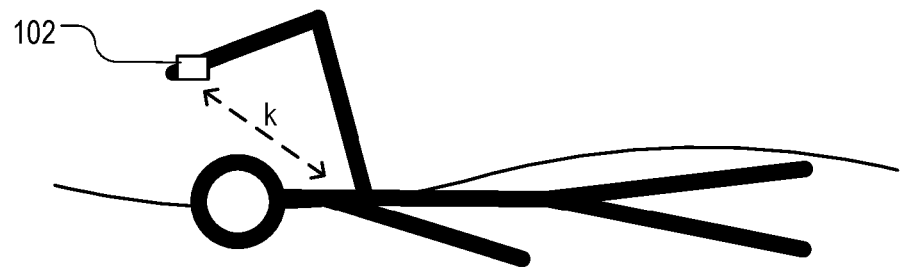
FIGS. 3A-3C are diagrams illustrating example techniques of selecting limb length scalars in determining the relative velocity.
Figure 3B:
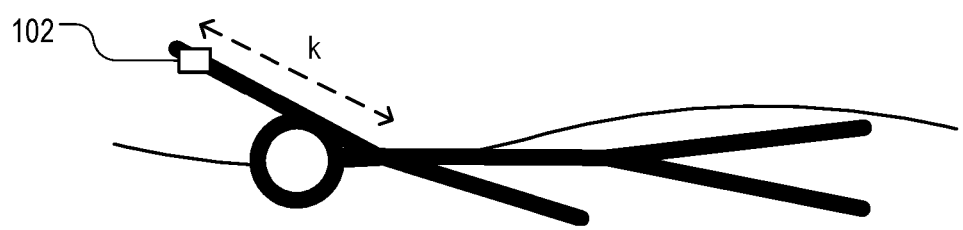
Figure 3C:
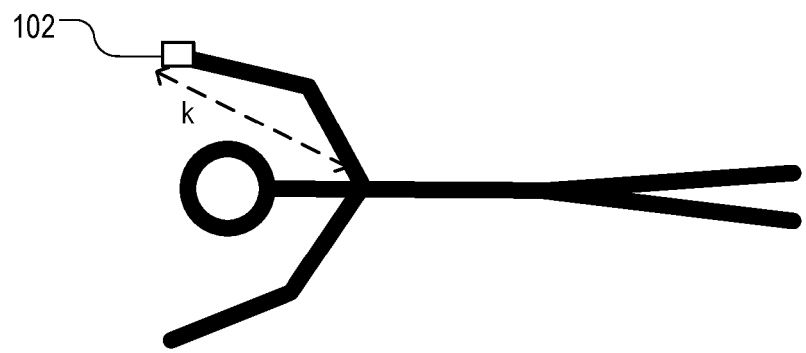

FIGS. 3A-3C are diagrams illustrating example techniques of selecting scalars for limb length in determining the relative velocity $V_{rel}$ as described in reference to Equations (3) and (4). Mobile device 102 can determine the scalar k using Equation (4) based on a stroke type of a swimmer. The stroke type can be a user input received by mobile device 102 through a user interface (e.g., a "stroke type" selection menu in a "swim mode" setting). In some implementations, mobile device 102 can determine a stroke type by comparing motion patterns recorded by sensors of mobile device 102 with reference motion patterns for various stroke types. For example, mobile device 102 can recognize a particular motion pattern recorded by one or more of an accelerometer, a gyroscope, a barometer, or a magnetometer and determine whether a corresponding stroke is a crawl stroke, sidestroke, backstroke, or butterfly stroke by comparing the recorded pattern with previously recorded training data. Mobile device 102 can determine the correspondence between the motion patterns and the stroke styles through training.

FIG. 3A is an example estimate of the scalar k in a crawl stroke mode. Upon determining that mobile device 102 is in a crawl stroke mode, mobile device 102 can determine the scalar k by modeling a posture of a limb (e.g., an arm) in a crawl stroke. In the example shown, mobile device 102 is worn on a wrist of an arm including a forearm and an upper arm. Mobile device 102 can determine that, on average, the forearm and upper arm are in a 90-degree angle. Mobile device 102 can assume each of the forearm and upper arm is one half (½) of the arm length L. Accordingly, mobile device 102 can determine that the scalar k shall be set to $$\frac{\sqrt{2}}{2}.$$

Mobile device 102 can then calculate the scalar speed of Equation (4) accordingly.

FIG. 3B is an example estimate of the scalar k in a backstroke mode. Upon determining that mobile device 102 is in a backstroke mode, mobile device 102 can determine the scalar k by modeling a posture of a limb in a backstroke. In the example shown, mobile device 102 is worn on a wrist. Mobile device 102 can determine that, on average, the arm is straight in backstroke swimming. Accordingly, mobile device 102 can determine that the scalar k shall be set to one. Mobile device 102 can then calculate the scalar speed accordingly.

FIG. 3C is an example estimate of the scalar k in a butterfly stroke mode. Upon determining that mobile device 102 is in a butterfly mode, mobile device 102 can determine the scalar k by modeling a posture of a limb in a butterfly stroke. In the example shown, mobile device 102 is worn on a wrist. Mobile device 102 can determine that, on average, the forearm and upper arm are in a 120 degree angle in butterfly stroke swimming (e.g., almost straight above water, 90 degrees underwater). Accordingly, mobile device 102 can determine that the scalar k shall be set to $$\frac{\sqrt{3}}{2}.$$

Mobile device 102 can then calculate the scalar speed accordingly.

Example Components for Swimmer Positioning

Figure 4:
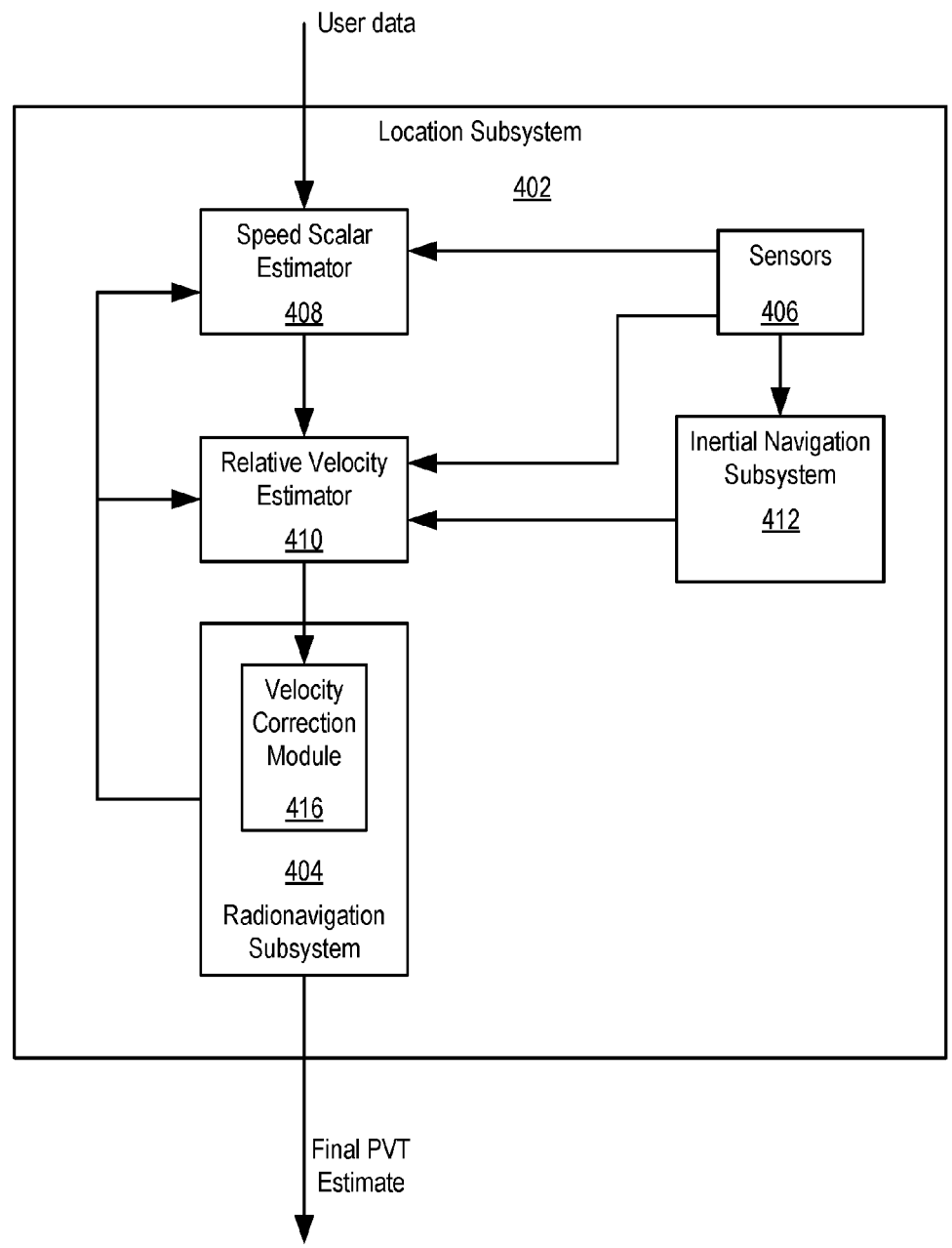
FIG. 4 is a block diagram illustrating components of an example location subsystem configured to estimate a velocity of a swimmer.

FIG. 4 is a block diagram illustrating components of example location subsystem 402 configured to estimate a velocity of a swimmer. Location subsystem 402 can be a component of mobile device 102 (of FIGS. 1-3). Each component of location subsystem 402 can include one or more processors configured to perform various functions.

Location subsystem 402 can include radionavigation subsystem 404. Radionavigation subsystem 404 is a component of location subsystem 402 configured to determine a PVT estimate using RF signals, including, for example, Wi-Fi signals, cellular signals, or GNSS signals. The PVT estimate can include a PVT solution from a GNSS receiver. The PVT estimate can include a component that indicates velocity of mobile device 102. Location subsystem 402 can include sensors 406. Sensors 406 can include one or more accelerometers, gyroscopes, magnetometers, barometers, and other mechanical or electronic sensors.

Location subsystem 402 can include speed scalar estimator 408. Speed scalar estimator 408 is a component of location subsystem 402 configured to determine scalar speed as described above in reference to Equation (4). Speed scalar estimator 408 can determine the scalar speed based on readings from sensor 406, velocity information from a PVT estimate provided by radionavigation subsystem 404, user data, or any combination of the above. The user data can include swimmer input including dimensions of the user's limbs, location of mobile device 102 on a limb (e.g., on finger, on wrist, or on upper arm), and optionally, stroke type. Speed scalar estimator 408 can determine values of the variables in Equation (4) based on the swimmer inputs and sensor readings, as described above.

Location subsystem 402 can include relative velocity estimator 410. Relative velocity estimator 410 is a component of location subsystem 402 configured to determine relative velocity $V_{rel}$ as described above in reference to Equation (3). In particular, relative velocity estimator 410 is configured to determine a unit vector DoT representing the direction of travel of mobile device 102. Relative velocity estimator 410 can determine the unit vector representing DoT the direction of travel based the PVT estimate from radionavigation subsystem 404, from various sensor readings, and from output from inertial navigation subsystem 412. Inertial navigation subsystem 412 is an optional component of location subsystem 402 configured to estimate a travel direction using inertial guidance technology, e.g., dead reckoning, from readings of one or more accelerometers and a compass.

Relative velocity estimator 410 can provide relative velocity $V_{rel}$ to radionavigation subsystem 404 for correcting the velocity component of the PVT estimate. Radionavigation subsystem 404 can include velocity correction module 416. Velocity correction module 416 is a component of radionavigation subsystem 404 configured to determine a torso velocity $V_{torso}$ based on the PVT estimate and the relative velocity $V_{rel}$ described in reference to Equation (1). Radionavigation subsystem 404 can then provide the corrected velocity as a final PVT estimate to various clients including but not limited to application programs and operating system components of mobile device 102. The application programs and components can then present a representation (e.g., X meters per second) of the corrected velocity as a velocity of the swimmer in a user interface and other results like a corrected position estimate and/or distance traveled, e.g., on a display surface.

Example Procedures

Figure 5:
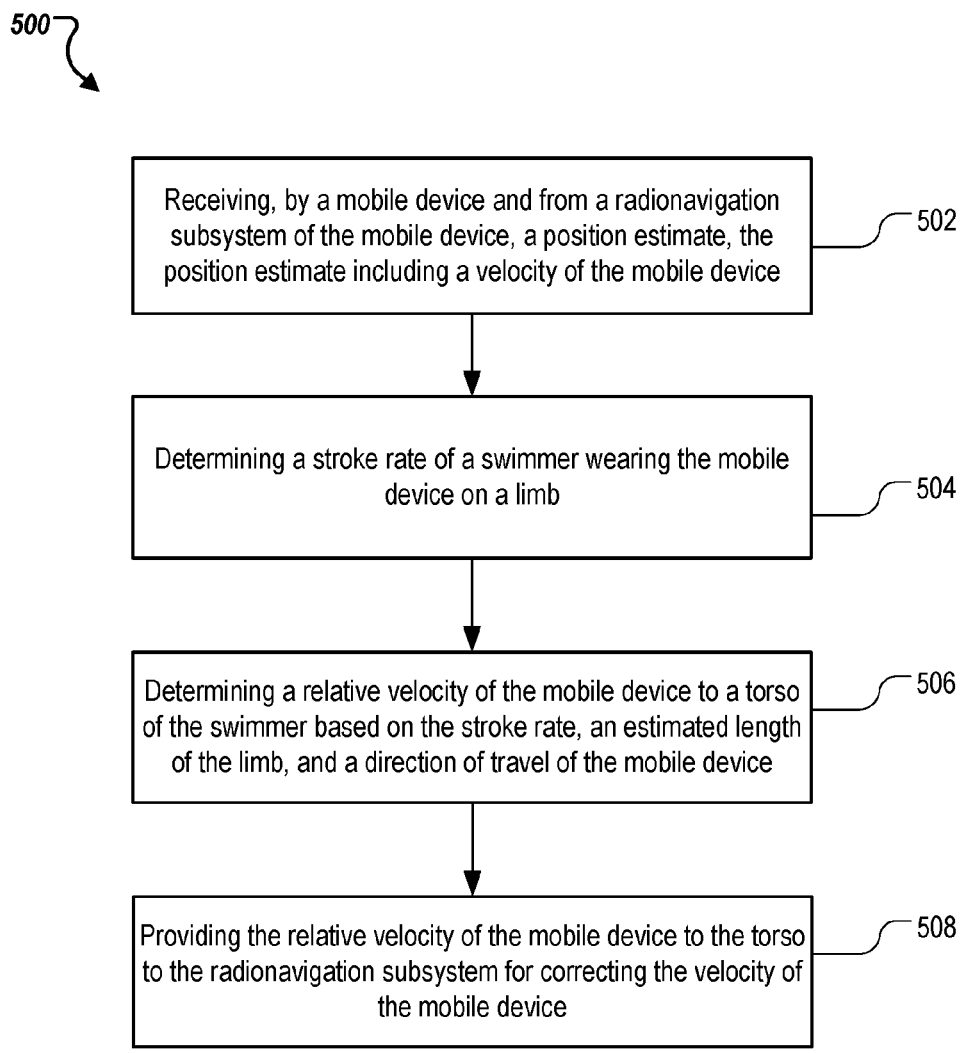
FIG. 5 is a flowchart of an example process of radionavigation by a mobile device worn by a swimmer.

FIG. 5 is a flowchart of an example process 500 of radionavigation by a mobile device worn by a swimmer. Process 500 can be performed by mobile device 102 (of FIGS. 1-3). Specifically, process 500 can be performed by location subsystem 402 (of FIG. 4), which is a component of mobile device 102.

Mobile device 102 can receive (502) from a radionavigation subsystem of mobile device 102, a PVT estimate, or, in a more simplified case, a velocity estimate. The PVT estimate can be a PVT solution from a GNSS receiver, or any navigation subsystem including RF navigation subsystem or other navigation subsystem of mobile device 102. The GNSS receiver can be configured to perform navigation functions based on signals transmitted by global positioning system (GPS), GLONASS, or Galileo satellites. The PVT estimate can include a velocity of the mobile device determined based on RF signals received by the GNSS receiver.

Mobile device 102 can determine (504) a stroke rate of a swimmer wearing mobile device 102 on a limb, e.g., an arm. Determining the stroke rate can be based at least in part on readings of sensors (e.g., accelerometers, gyros) of the mobile device linear acceleration, angular acceleration, or any combination of the above, where mobile device 102 determines periodic changes in attitude. Determining the stroke rate can be based at least in part on readings of sensors (e.g., accelerometers, magnetometers) measuring magnetic fields and acceleration, where mobile device 102 determines periodic changes in movement. Determining the stroke rate can be based at least in part on readings of a barometer of the mobile device indicating periods that mobile device 102 is submerged or is above water.

Mobile device 102 can determine (506) a velocity of mobile device 102 relative to a torso of the swimmer based on the stroke rate, an estimated length of the limb, and a direction of travel of the mobile device 102. The relative velocity (e.g., relative velocity $V_{rel}$ of Equation (1)) can be a vector representing movement of the limb relative to the torso. Mobile device 102 can estimate the length of the limb based on a user input indicating a height of the swimmer. Mobile device 102 can estimate the length of the limb by learning during a current swim or based on stroke data collected from one or more previous swims. The direction of travel can be an absolute direction in an ECEF, geodetic, ENU or any other suitable reference coordinate frame. The absolute direction can be a vector representing direction of travel of the limb relative to the torso and direction of travel of the torso.

Mobile device 102 can determine the direction of travel based on the PVT estimate or the velocity estimate. In some implementations, mobile device 102 can determine the direction of travel based on an output from inertial navigation subsystem 412 of mobile device 102. Optionally, mobile device 102 can determine relative velocity further based on a stroke type. In some implementations, mobile device 102 can determine the direction of travel based on geographic data. The geographic data can indicate an orientation of a body of water (e.g., a river, or a swimming pool). Mobile device 102 can associate different stroke types with different scalars, and apply a scalar in the determination of the relative velocity according to the stoke type.

Mobile device 102 can provide (508) the velocity of the mobile device relative to the torso to the radionavigation subsystem for correcting the velocity of the mobile device 102 into a torso velocity of the swimmer through an interface of the radionavigation subsystem. Providing the relative velocity to the radionavigation subsystem for correcting the velocity of mobile device 102 can include instructing radionavigation subsystem 404 to determine a travel distance of the swimmer by integrating the torso velocity over time. Providing the relative velocity of the mobile device 102 to radionavigation subsystem 404 for correcting the velocity of mobile device 102 can include instructing the radionavigation subsystem to correct one or more radionavigation observables of the RF signals according to the relative velocity. The one or more radionavigation observables can include at least one of a Doppler shift or a carrier phase.

Exemplary Mobile Device Architecture

Figure 6:
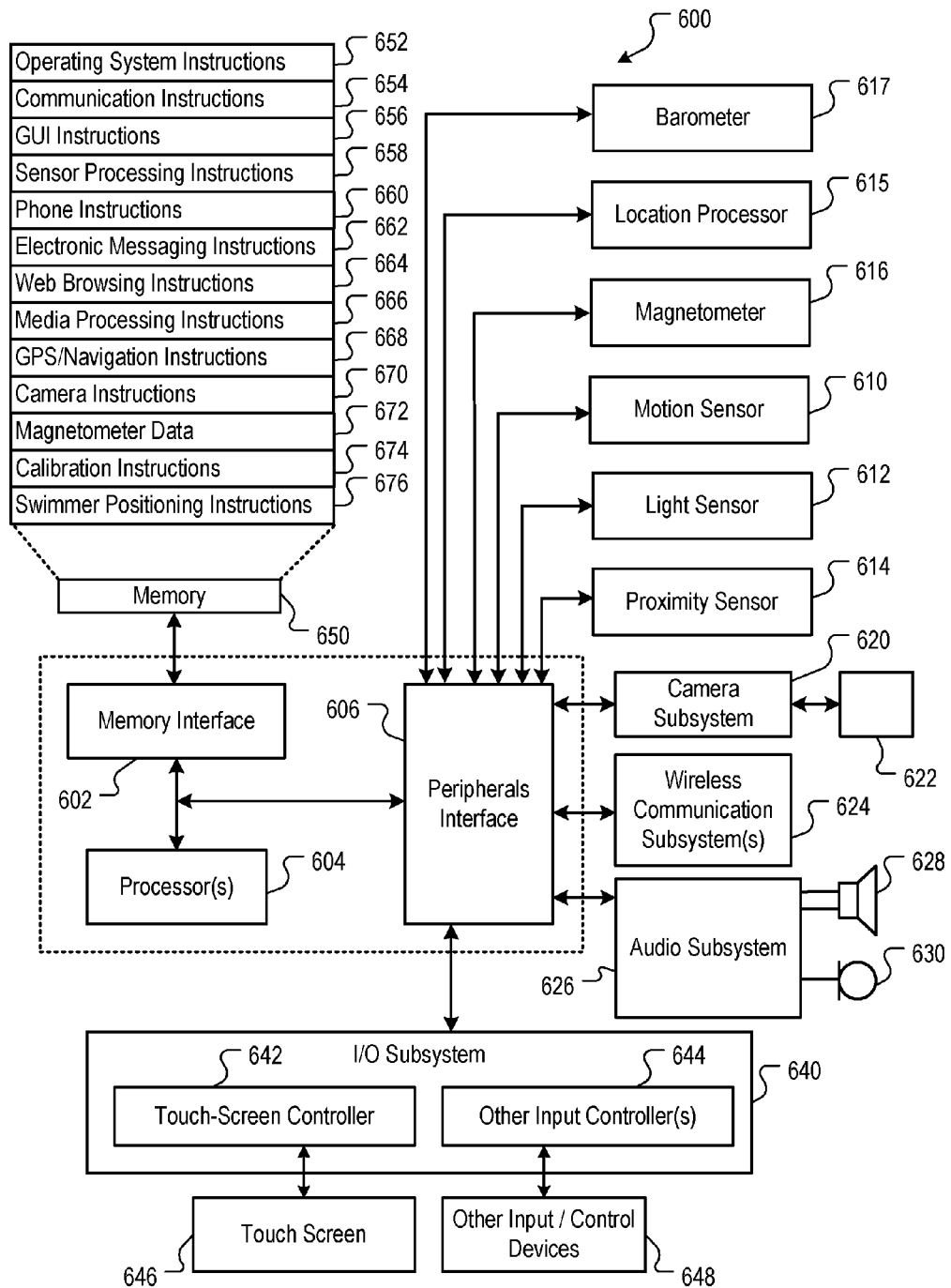
FIG. 6 is a block diagram illustrating an example device architecture of a mobile device implementing the features and operations described in reference to FIGS. 1-5.

FIG. 6 is a block diagram illustrating an exemplary device architecture 600 of a mobile device implementing the features and operations described in reference to FIGS. 1-5. A mobile device can include memory interface 602, one or more data processors, image processors and/or processors 604 and peripherals interface 606. Memory interface 602, one or more processors 604 and/or peripherals interface 606 can be separate components or can be integrated in one or more integrated circuits. Processors 604 can include application processors, baseband processors and wireless processors. The various components in the mobile device, for example, can be coupled by one or more communication buses or signal lines.

Sensors, devices and subsystems can be coupled to peripherals interface 606 to facilitate multiple functionalities. For example, motion sensor 610, light sensor 612 and proximity sensor 614 can be coupled to peripherals interface 606 to facilitate orientation, lighting and proximity functions of the mobile device. Location processor 615 can be connected to peripherals interface 606 to provide geopositioning. In some implementations, location processor 615 can be programmed to perform the operations of radionavigation subsystem 404. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Motion sensor 610 can include one or more accelerometers configured to determine change of speed and direction of movement of the mobile device. Barometer 617 can include one or more devices connected to peripherals interface 606 and configured to measure pressure of atmosphere around the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi™ or WiMax™ network and a Bluetooth™ network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646 or pad. Touch surface 646 and touch surface controller 642 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 646. Touch surface 646 can include, for example, a touch screen.

Other input controller(s) 644 can be coupled to other input/control devices 648, such as one or more buttons, rocker switches, thumb-wheel, infrared port, USB port and/or a pointer device such as a stylus. The one or more buttons (not shown) can include an up/down button for volume control of speaker 628 and/or microphone 630.

In one implementation, a pressing of the button for a first duration may disengage a lock of the touch surface 646; and a pressing of the button for a second duration that is longer than the first duration may turn power to the mobile device on or off. The user may be able to customize a functionality of one or more of the buttons. The touch surface 646 can, for example, also be used to implement virtual or soft buttons and/or a keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 602 can be coupled to memory 650. Memory 650 can include high-speed random access memory and/or non-volatile memory, such as one or more magnetic disk storage devices, one or more optical storage devices and/or flash memory (e.g., NAND, NOR). Memory 650 can store operating system 652, such as iOS, Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Location instructions 668 to facilitate generic GNSS and location-related processes and functions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can store swimmer positioning instructions 676 that, when executed by processor 604, can cause processor 604 to perform operations of estimating a position, velocity, or both, of a swimmer. The operations can include the operations described above in various examples in reference to various figures, e.g., process 500 of FIG. 5.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Figure 7:
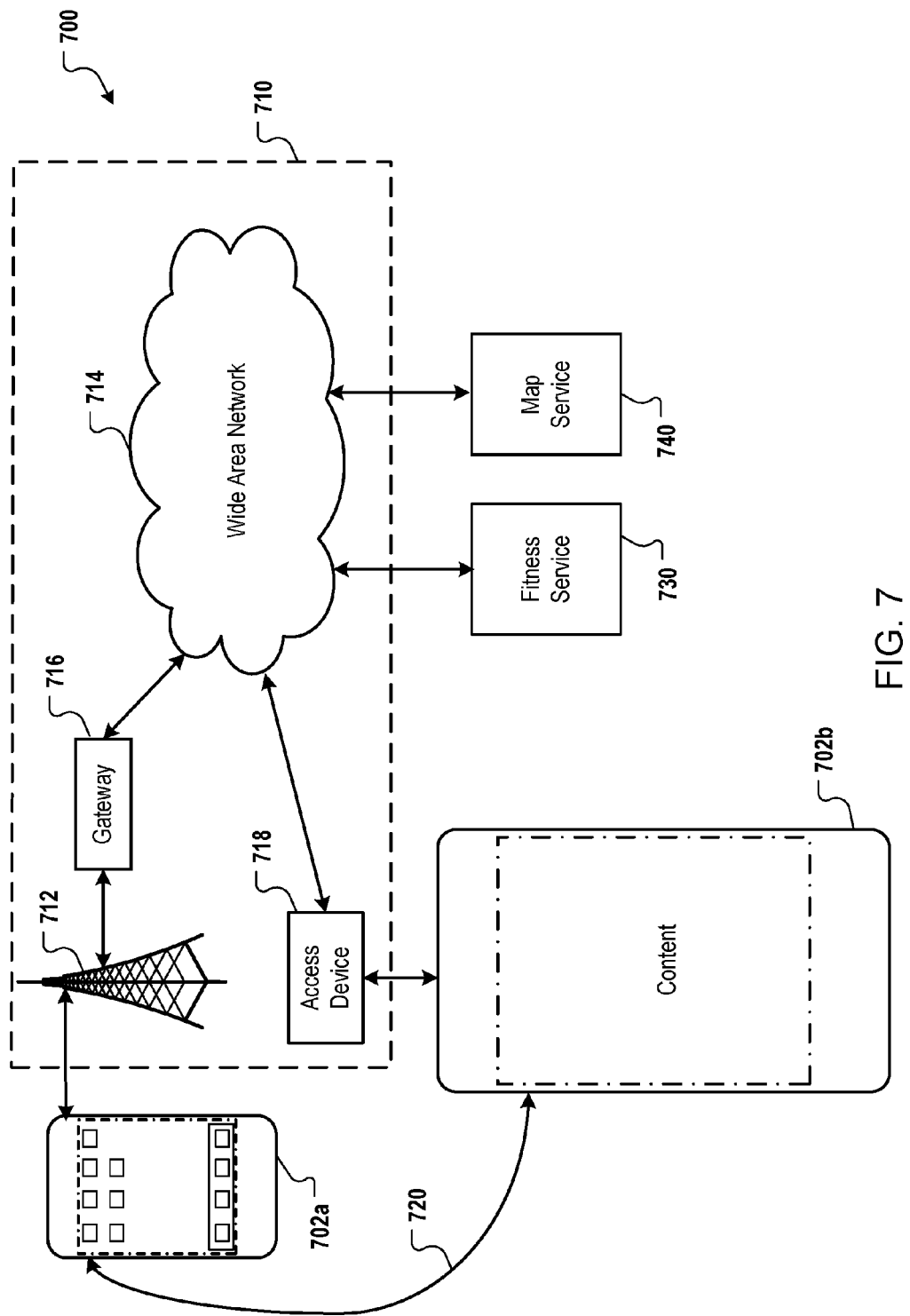
FIG. 7 is a block diagram of an example network operating environment for the mobile devices of FIGS. 1-5.

FIG. 7 is a block diagram of an example network operating environment 700 for the mobile devices of FIGS. 1-5. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access point, can provide communication access to the wide area network 714. Each of mobile devices 702a and 702b can be mobile device 102.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages, and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, wireless device 702a can communicate with other wireless devices, e.g., other mobile devices, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

The mobile device 702a or 702b can, for example, communicate with one or more services 730 and 740 over the one or more wired and/or wireless networks. For example, one or more fitness services 730 can determine fitness information, including, for example, calories burnt, based on information (e.g., swimming velocity) received from mobile devices 702a and 702b. The one or more fitness services 730 can provide the fitness information to mobile devices 702a and 702b for presentation to a swimmer. Map service 740 can provide virtual maps to mobile devices 702a and 702b for displaying estimated locations, where a swimmer's location can be displayed in the virtue maps.

Mobile device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:
   receiving, by a radio frequency (RF) receiver of a mobile device, RF signals;
   determining, by a processor of the mobile device, a velocity of the mobile device based on the RF signals;
   receiving, by the processor, sensor data from one or more sensors of the mobile device;
   determining, by the processor, an angular speed of a limb of a swimmer wearing the mobile device on the limb, the angular speed determined at least in part from the sensor data;
   determining, by the processor, a direction of travel of the mobile device, the direction of travel determined at least in part from the sensor data;
   determining a relative velocity based on the angular speed of the limb, an estimated length of the limb, and the direction of travel of the mobile device, the relative velocity being a velocity of the mobile device relative to a torso of the swimmer;
   determining, by the processor, a velocity of the swimmer based on a difference between the velocity of the mobile device and the relative velocity; and
   presenting, on a display of the mobile device, a representation of at least one of the velocity of the swimmer, a position of the swimmer based on the velocity of the swimmer or a distance traveled by the swimmer based on the velocity of the swimmer.

2. The method of claim 1, wherein determining the angular speed of the limb is based at least in part on readings of the one or more sensors of the mobile device measuring linear and angular acceleration.

3. The method of claim 1, wherein determining the angular speed of the limb is based at least in part on readings of the one or more sensors of the mobile device measuring magnetic field and acceleration.

4. The method of claim 1, wherein determining the angular speed of the limb is based at least in part on readings of a barometer of the mobile device indicating periods that the mobile device is above water.

5. The method of claim 1, wherein the length of the limb is estimated based on a user input indicating a height of the swimmer.

6. The method of claim 1, wherein the length of the limb is estimated by learning during a current swim or based on stroke data collected from one or more previous swims.

7. The method of claim 1, wherein the direction of travel is determined based on the velocity of the mobile device.

8. The method of claim 1, wherein the direction of travel is determined based on an output from an inertial navigation subsystem of the mobile device.

9. The method of claim 1, wherein the direction of travel is determined based on geographic data indicating an orientation of a body of water.

10. The method of claim 1, wherein the distance traveled by the swimmer is determined by integrating the velocity of the mobile device.

11. The method of claim 1, further comprising instructing the radionavigation subsystem to correct one or more radionavigation observables of the RF signals according to the relative velocity.

12. The method of claim 11, wherein the one or more radionavigation observables include at least one of a Doppler shift or a carrier phase.

13. A mobile device comprising:
   one or more processors; and
   a non-transitory computer-readable medium storing instructions that, when executed by the one or more processors, cause the one or more processors to perform operations comprising:
      receiving, by a radio frequency (RF) receiver of a mobile device, RF signals;
      determining, by a processor of the mobile device, a velocity of the mobile device based on the RF signals;
      receiving, by the processor, sensor data from one or more sensors of the mobile device:
      determining, by the processor, an angular speed of a limb of a swimmer wearing the mobile device on the limb, the angular speed determined at least in part from the sensor data;

determining, by the processor, a direction of travel of the mobile device, the direction of travel determined at least in part from the sensor data;

determining a relative velocity based on the angular speed of the limb, an estimated length of the limb, and the direction of travel of the mobile device, the relative velocity being a velocity of the mobile device relative to a torso of the swimmer;

determining, by the processor, a velocity of the swimmer based on a difference between the velocity of the mobile device and the relative velocity; and presenting, on a display of the mobile device, a representation of at least one of the velocity of the swimmer, a position of the swimmer based on the velocity of the swimmer or a distance traveled by the swimmer based on the velocity of the swimmer.

14. The mobile device of claim 13, wherein determining the angular speed of the limb is based at least in part on readings of the one or more sensors of the mobile device measuring linear and angular acceleration.

15. The mobile device of claim 13, wherein the length of the limb is estimated based on a user input indicating a height of the swimmer.

16. The mobile device of claim 13, wherein the length of the limb is estimated by learning during a current swim or based on stroke data collected from one or more previous swims.

17. The mobile device of claim 13, wherein the direction of travel is determined based on the velocity of the mobile device.

18. The mobile device of claim 13, wherein the direction of travel is determined based on an output from an inertial navigation subsystem of the mobile device.

19. A non-transitory computer-readable medium storing instructions that when executed by one or more processors, cause the one or more processors to perform operations comprising:

receiving, by a radio frequency (RF) receiver of a mobile device, RF signals;

determining, by a processor of the mobile device, a velocity of the mobile device based on the RF signals;

receiving, by the processor, sensor data from one or more sensors of the mobile device:

determining, by the processor, an angular speed of a limb of a swimmer wearing the mobile device on the limb, the angular speed determined at least in part from the sensor data;

determining, by the processor, a direction of travel of the mobile device, the direction of travel determined at least in part from the sensor data;

determining a relative velocity based on the angular speed of the limb, an estimated length of the limb, and the direction of travel of the mobile device, the relative velocity being a velocity of the mobile device relative to a torso of the swimmer;

determining, by the processor, a velocity of the swimmer based on a difference between the velocity of the mobile device and the relative velocity; and presenting, on a display of the mobile device, a representation of at least one of the velocity of the swimmer, a position of the swimmer based on the velocity of the swimmer or a distance traveled by the swimmer based on the velocity of the swimmer.

20. The non-transitory computer-readable medium of claim 19, wherein determining the angular speed of the limb is based at least in part on readings of the one or more sensors of the mobile device measuring linear and angular acceleration.

* * * * *